(12) United States Patent
Barnaal

(10) Patent No.: US 11,027,410 B2
(45) Date of Patent: Jun. 8, 2021

(54) ERGONOMIC LATERAL MANUAL SWEEPING DEVICE

(71) Applicant: Erik P. Barnaal, Glendale, CO (US)

(72) Inventor: Erik P. Barnaal, Glendale, CO (US)

( * ) Notice: Subject to any disclaimer, the term of this patent is extended or adjusted under 35 U.S.C. 154(b) by 0 days.

(21) Appl. No.: 16/552,229

(22) Filed: Aug. 27, 2019

(65) Prior Publication Data

US 2021/0060759 A1 Mar. 4, 2021

(51) Int. Cl.
*B25G 1/10* (2006.01)
*A46B 5/02* (2006.01)
*A01D 7/00* (2006.01)
*B25G 1/04* (2006.01)

(52) U.S. Cl.
CPC ............... *B25G 1/102* (2013.01); *A01D 7/00* (2013.01); *A46B 5/021* (2013.01); *B25G 1/04* (2013.01); *A46B 2200/302* (2013.01)

(58) Field of Classification Search
CPC .. B25G 1/102; B25G 1/04; B25G 1/10; A46B 5/021; A46B 2200/302; A46B 5/02; A46B 5/023; A46B 5/025; A46B 5/026; A01D 7/00
USPC ....... 15/143.1; 16/430, 426, 440; 135/71, 73
See application file for complete search history.

(56) References Cited

U.S. PATENT DOCUMENTS

| | | | |
|---|---|---|---|
| 2,482,589 A | 9/1949 | Maguire | |
| 2,528,706 A * | 11/1950 | Osborn | A61H 3/02 135/69 |
| 3,304,946 A * | 2/1967 | Lutes | A61H 3/02 135/69 |
| 5,529,357 A | 6/1996 | Hoffman | |
| 5,832,563 A | 11/1998 | Simpson | |
| 6,023,924 A | 2/2000 | Babineau | |
| 6,199,245 B1 * | 3/2001 | Blessing | B25G 1/06 16/422 |
| 7,637,882 B2 | 12/2009 | Carman, Jr. et al. | |
| 8,511,209 B1 | 8/2013 | Bishop et al. | |
| 8,776,648 B2 | 7/2014 | Lee | |
| 8,973,200 B2 | 3/2015 | Mallett | |
| 9,573,265 B2 | 2/2017 | Li | |

(Continued)

FOREIGN PATENT DOCUMENTS

CN 2484895 Y 4/2002
CN 201341853 11/2009
(Continued)

OTHER PUBLICATIONS

Translation of KR101858489, retrieved from Espacent May 20, 2020 (Year: 2018).*

(Continued)

*Primary Examiner* — Laura C Guidotti
*Assistant Examiner* — Thomas Raymond Rodgers
(74) *Attorney, Agent, or Firm* — Loza & Loza, LLP; Gordon R. Lindeen, III

(57) ABSTRACT

An ergonomic lateral sweeping device is described. In an embodiment, the device has a sweeping head such as a broom or rake head, and an elongated pole attached to the head. A paddle is attached to the elongated pole opposite the head, the paddle being wider than the elongated pole. Some embodiments also include a horizontal handle attached to the elongated pole and extending perpendicular to the elongated pole.

20 Claims, 12 Drawing Sheets

(56) References Cited

U.S. PATENT DOCUMENTS

| | | | |
|---|---|---|---|
| 2006/0005358 A1* | 1/2006 | Kemmler | B25F 5/02 16/430 |
| 2006/0174449 A1* | 8/2006 | Hughes | A61F 4/00 16/430 |
| 2010/0005607 A1 | 1/2010 | DelaBarre | |
| 2011/0099765 A1 | 5/2011 | Youssefieh | |
| 2012/0144964 A1* | 6/2012 | Lee | A01B 1/00 81/489 |
| 2013/0269131 A1 | 10/2013 | Mallett | |
| 2014/0217760 A1* | 8/2014 | Walden | A01B 1/026 294/58 |
| 2017/0014986 A1* | 1/2017 | Chou | A01B 1/16 |

FOREIGN PATENT DOCUMENTS

| | | |
|---|---|---|
| CN | 106473683 | 3/2017 |
| KR | 20110053882 A | 5/2011 |
| KR | 200461617 | 7/2012 |
| KR | 20170142616 A | 12/2017 |
| KR | 101858489 B1 * | 5/2018 |

OTHER PUBLICATIONS

PCT/US2020/048228. International Search Report & Written Opinion (dated Dec. 7, 2020).

\* cited by examiner

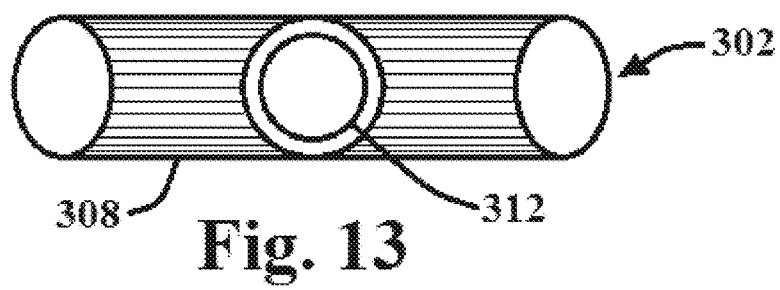
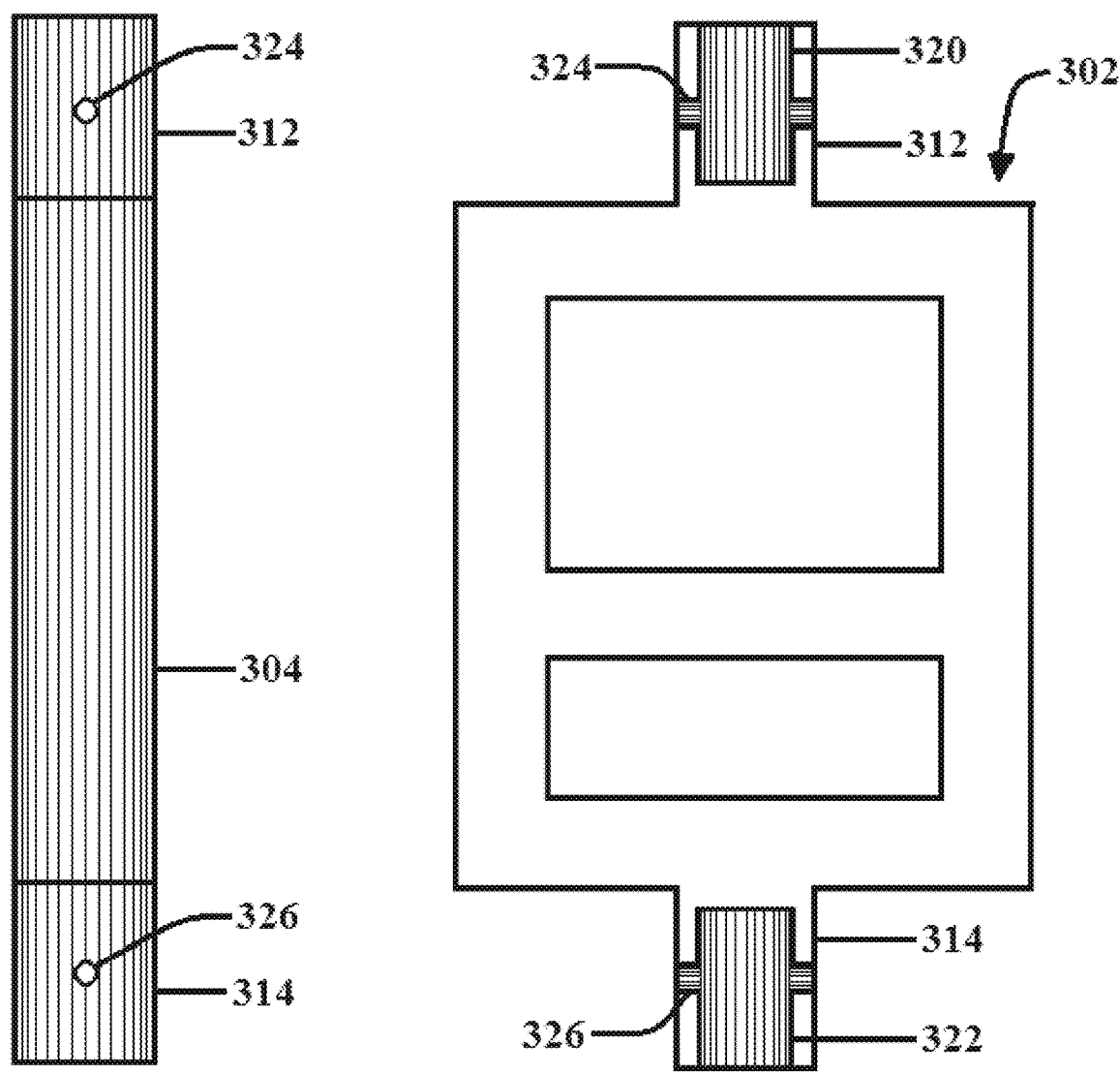

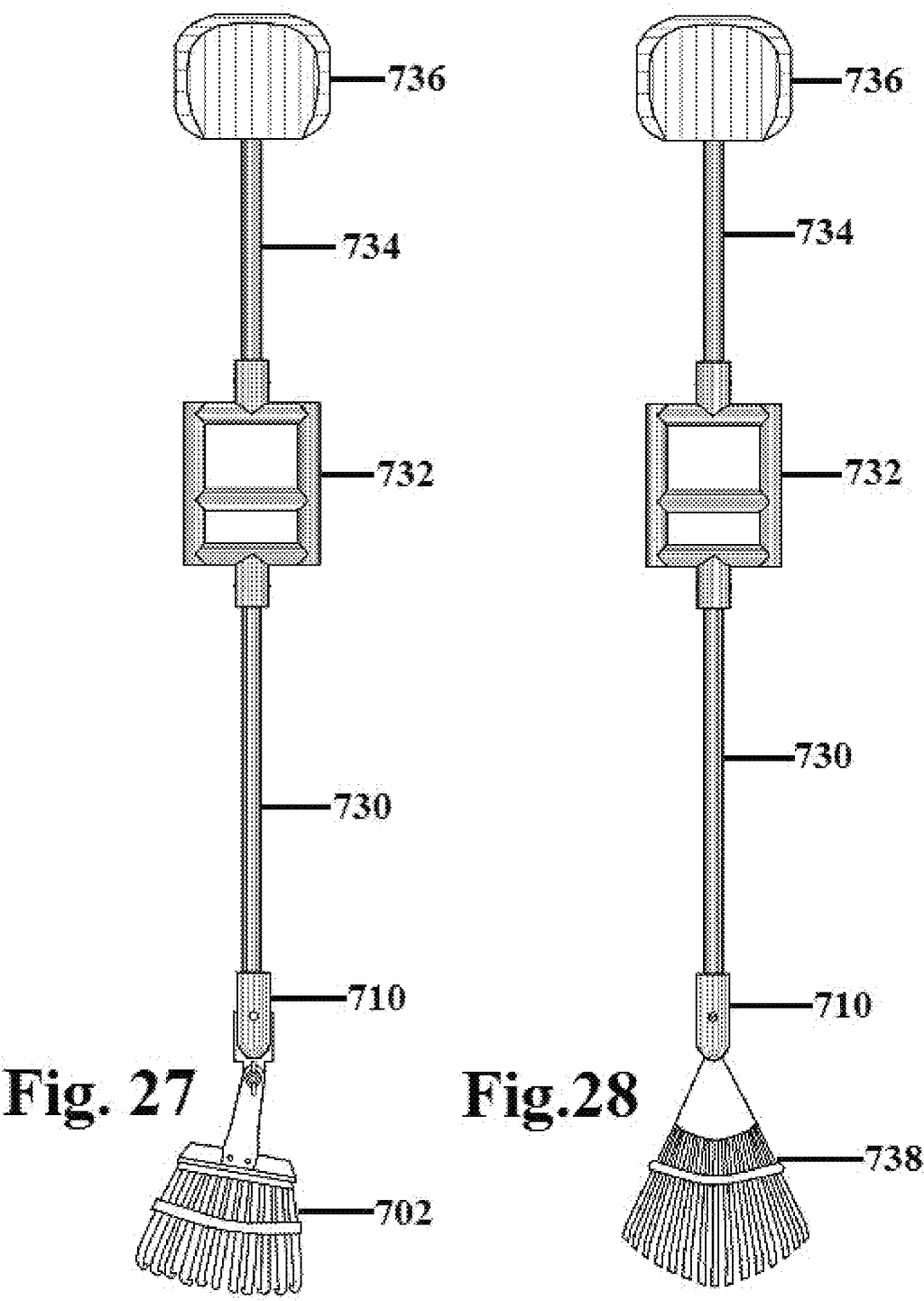

ERGONOMIC LATERAL MANUAL SWEEPING DEVICE

FIELD

The present description relates to the field of manual sweeping devices, such as brooms and rakes and, in particular to an ergonomic sweeping device with a top paddle.

BACKGROUND

A common sweeping device is a broom or rake that has a sweeping part, sometimes referred to as a head, at one end and a long broom stick or handle that extends from the sweeping part. The long straight broom stick allows a person to hold the sweeping device in many different ways for many different sweeping motions. The broom stick is particularly well-suited for two handed operation in which each hand holds the stick at a different position, both near elbow height, to apply different motions to the stick. The broom stick is simple, inexpensive and can be used by many different people without adjustment.

BRIEF DESCRIPTION OF THE DRAWING FIGURES

The invention may best be understood by referring to the following description and accompanying drawings that are used to illustrate embodiments of the invention in which like reference numbers are used to refer to similar objects. In the drawings:

FIG. 12 is a side plan view of the handle of FIG. 10 according to an embodiment of the invention;

FIG. 13 is a top plan view of the handle of FIG. 10 according to an embodiment of the invention;

FIG. 14 is a cross-sectional front view of the handle of FIG. 10 according to an embodiment of the invention;

FIG. 27 is a front plan view of an ergonomic sweeping device with a rake head according to an embodiment of the invention;

FIG. 28 is a front plan view of an ergonomic sweeping device with an alternate rake head according to an embodiment of the invention.

DETAILED DESCRIPTION

Figure 1:
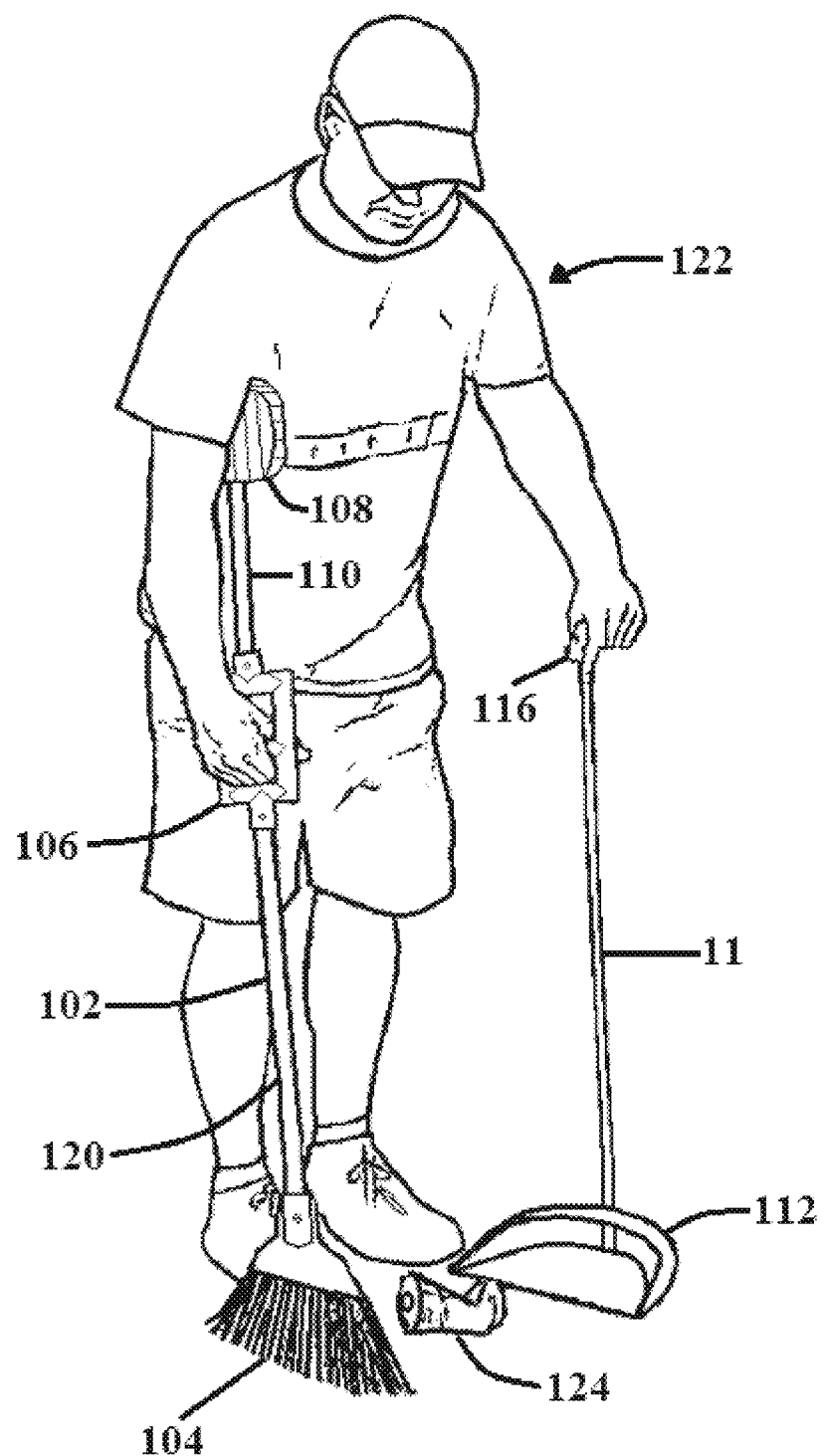
FIG. 1 is an isometric diagram of sweeping refuse into a dustpan according to an embodiment of the invention.

The described ergonomic lateral sweeping device is easily used with one hand, one arm and a side of the torso to operate as an efficiently designed class 3 lever where the effort force is central to the lever system. The force of friction of the upper torso or arm and armpit lightly squeezing the top paddle and the force translated to the top paddle into the torso from the effort force of the broom or rake acts to securely fix the fulcrum. The hand is centrally positioned along the vertical axis on a horizontal handle near the middle of the broom or rake and acts as the effort. The work that is done by the broom head or rake is the load.

When a common sweeping device is used laterally with a dustpan or scoop, the user tends to hold the broom in one hand and the dustpan in the other hand. The simple unilateral sweeping motion is made more difficult when only one hand is being used with a broom stick. Instead of using the power of both arms in cooperation, the user must rely on much smaller finger, hand, wrist and forearm muscles to provide rigidity as well as a usable force to the broom head or rake. It is more difficult to apply this force, the higher the user grips the broom stick, i.e. the farther the user's hand is from the head. The user then either leans over to hold the broom handle close to the broom head while sweeping or must apply a large force to the broomstick at a comfortable height. With prolonged sweeping, a broom stick is uncomfortable to use with a dustpan. This reduces the amount of time spent sweeping and the effectiveness of the sweeping during that time. Prolonged sweeping also increases chances of physiological injury to the small muscles of the wrist and hand, such as carpal tunnel syndrome.

The described embodiments for a unilateral sweeping device, such as a broom or rake, are easier to use, allows greater efficiency and provides ergonomic benefits that are not possible when a waist high lobby broom, conventional broom, or broom with an arm ring are used in conjunction with a long-handled dustpan which is held by the other hand. The sweeping device is also easier to use for anyone who sweeps with one hand including those with a disability that limits the use of a second hand or arm.

The sweeping device operates laterally as a lever with a fixed fulcrum, an effort and a load. Levers can be designed in different ways and offer different results in terms of mechanical advantage. This sweeping device is designed to consider the dynamics of lever advantage and efficiently apply this knowledge to human physical anatomy.

Described embodiments are sweeping devices that operate as a lateral class 3 lever with a fixed fulcrum, the longest practicable effort arm, and a load arm that fits the user. The bulk of the motive force comes from the large muscles of the upper arm, shoulder and torso (the muscles used to raise and lower the entire arm) not from the lower muscles of the arm including the forearm, wrist, hand and fingers. This design reduces strain, fatigue and injury on the smaller muscles and joints of the lower arm. These are heavily worked with vertical broom sticks, especially when the boom stick is used with one arm.

One-handed operation with a standard broomstick relies on finger, hand, wrist and forearm muscles to provide rigidity as well as to provide a usable lateral force to the broom head or rake. There is a considerable torque that the wrist and adjacent body parts must endure to maintain rigidity across the sweeping head and to also provide the motive action while operating the tool. Since, the torque is proportional to the distance from the hand grip to the broom head, the wrist must endure about three times the force that is applied to the load. Commonly people align their pointer finger with the shaft of the tool in an attempt to shorten the distance to the load thus reducing torque and increasing stability. However, this causes much of the force to be applied through that aligned extended finger increasing the strain on one of the smallest muscles in the body.

FIG. 1 is an isometric diagram of an ergonomic unilateral sweeping device with a broom head in use with a horizontal handle dustpan. This shows the sweeping device in one example use scenario. A sweeper, operator, user, or person 122 holds a dustpan 112 in one hand. This example dustpan has a long vertical pole 114 with a horizontal handle 116 that allows the dustpan to be manipulated when the sweeper 122 is standing upright. The height of the handle may be fixed or adjustable and any of a variety of other types of handles or dustpans may be used. The sweeping device 102 has, in order from bottom to top, a broom or rake head 104, a vertical broom stick or lower connecting pole 120, a horizontal handle 106, a second upper part of the broom stick or connecting pole 110, and a top paddle 108. As shown, the horizontal handle 106 allows the sweeper to sweep the broom head across the ground toward the dustpan 112 using leverage against the top paddle 108. This allows the sweeper to ergonomically sweep refuse 124 into the dustpan using only one arm.

The broom stick may be attached to the to the top paddle 108 using a press fit cylinder or similar type of connector. The broom stick is made up of a paddle to handle connecting pole 110 and a handle to broom or rake head connecting pole 120 that are attached together on either end of a horizontal handle 106. The broom may have angled bristles and the rake may have angled tines that extend from the handle to broom or rake head connection pole.

Figure 2:
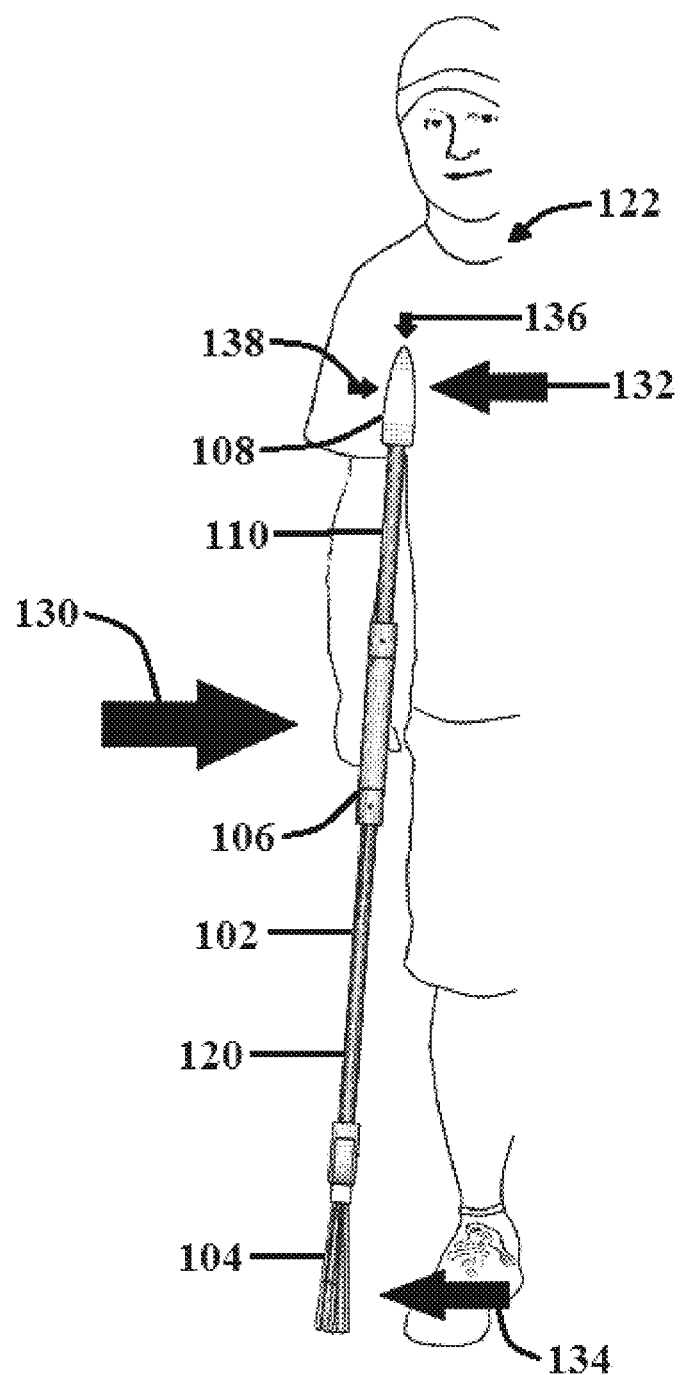
FIG. 2 is an isometric diagram of a sweeper with an ergonomic sweeping device according to an embodiment of the invention.

FIG. 2 is a diagram of the sweeper or user 122 with the ergonomic unilateral sweeping device. The handle 106 allows the user 122 to exert a force against the handle in the sweeping direction as shown by the arrow 130. This force is resisted by a force in the opposite direction caused in part by the friction of the broom head or rake 104 against the ground and in part by the refuse that is being swept as indicated by the opposite facing arrow 134.

The paddle 108 has a shape that is ergonomically designed to fit comfortably when placed just under the armpit between the arm and torso, as shown. It offers a combination of designs and strategies that offer a great degree of stability when sweeping and when resting. Generally, it is fixed in place by friction from the force 138 of a gentle inward squeezing action of the arm against the torso. There is a gentle upward force 136 of the hand on the handle as well as the increasing force 130 of the effort on the load 134 which translates to the fulcrum at the paddle 108, increasing pressure 132 against the torso, as one sweeps. This motion thereby increases the force of friction that stabilizes and secures the fulcrum, the top paddle, in place.

Figure 3:
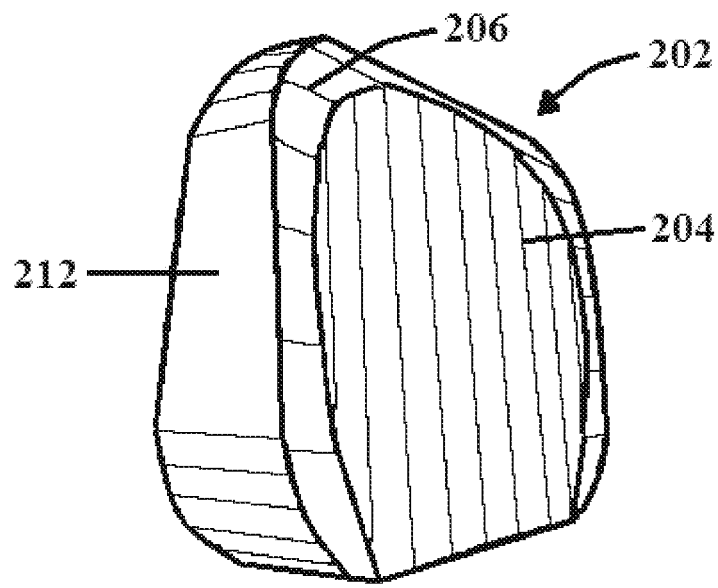
FIG. 3 is an isometric front view of an example of a paddle suitable for use with the sweeping device according to an embodiment of the invention.

FIG. 3 is an isometric front view of an example of a paddle 202 suitable for use with the sweeping system described herein. The paddle has a large front surface 204 and rounded sides 212. The paddle front 204 and rear surfaces are designed to increase the force of friction holding it in place by covering the exterior of the paddle with a material with a relatively high coefficient of friction such as rubber, silicone rubber, or soft silicone which also can facilitate comfort. The surface may also be textured as shown with vertical ribs or another texture to further increase surface friction. The sides or edges 212 of the paddle may be constructed of a similar material or a more rigid material.

Figure 4:
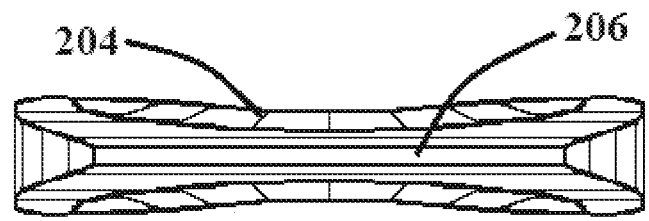
FIG. 4 is a top plan view of the paddle of FIG. 3 according to an embodiment of the invention.

FIG. 4 is a top plan view of the paddle showing a top transition surface 206 that is narrow and expands gradually to the large front surface 204 of the paddle. As shown, comfort and control are improved when the sides 204 of the paddle optionally have a slight horizontal concave shape where the middle of the paddle is the narrowest spot and is parallel to sides of the paddle. In other words, the front and rear surfaces of the paddle are curved so that the paddle has a smaller width at the center of the front and rear surfaces and is wider at the edges of the front and rear surfaces. This tends to center the paddle in the grip of the user and helps to keep the paddle between the arm and the torso. Alternatively, the paddles may have vertical ridges at the edges of the paddle or may have a linear V shape with a center of the V being the narrowest point at the horizontal center of the paddle and the edges being the widest point.

Figure 5:
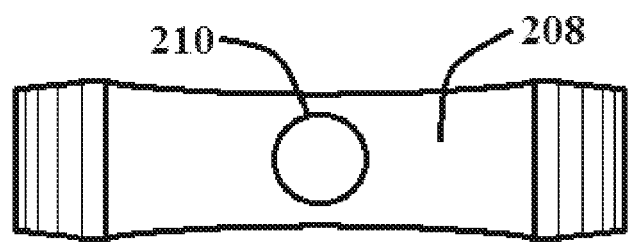
FIG. 5 is a bottom plan view of the paddle of FIG. 3 according to an embodiment of the invention.

FIG. 5 is a bottom plan view showing that the bottom surface is much wider than the top surface. This shape is more ergonomic in that it correlates to the narrow distance between arm and torso near the armpit and then provides a wider surface for the user to grip closer to the elbow. The bottom surface 208 of the paddle has a hole 210 to receive the paddle connection pole 110 either directly or using a press fit or any other suitable type of connector.

Figure 6:
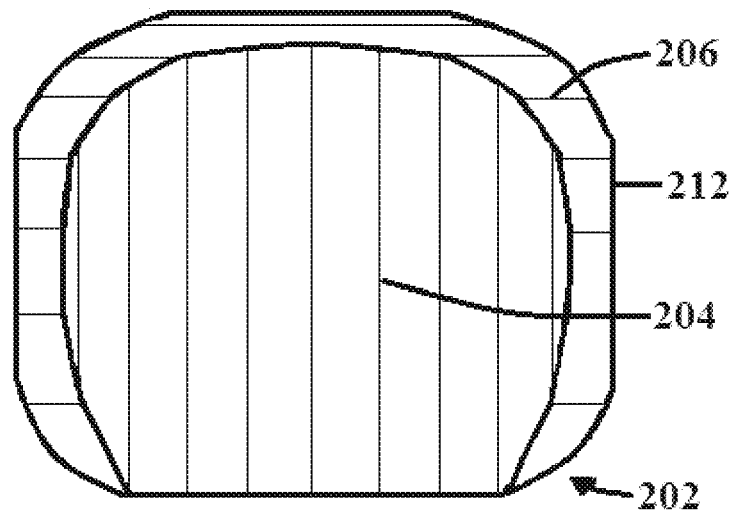
FIG. 6 is a front plan view of the paddle of FIG. 3 according to an embodiment of the invention.

FIG. 6 is a front plan view of the paddle showing a wide front surface 204 with a rounded transition area 206 to the sides or edges 212 of the paddle. The wider surface allows the paddle to be gripped between the arm and the torso across a large surface to reduce pressure at any particular point on the body. It also allows the paddle to be gripped in many different positions to reach the sweeping motion in different directions and to different locations.

Figure 7:
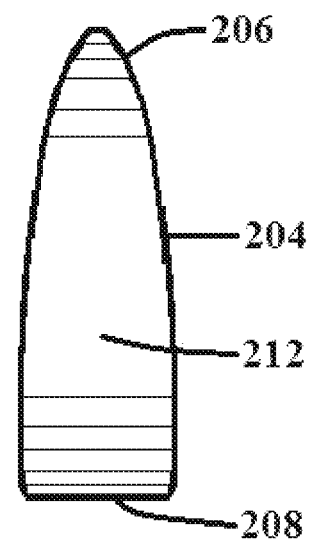
FIG. 7 is a side plan view of the paddle of FIG. 3 according to an embodiment of the invention.

Although a simple rectangular or similar shape will work as the paddle and provide a fulcrum for sweeping. The illustrated shape has a low angle (5 to 10 degrees) dull edge wedge shape to the front 204 and back with the narrow part of the wedge at the top and the wide part at the bottom 208 (as shown in FIG. 7). Thus the wider part of the edge is at the bottom surface proximate the pole and the narrower part is at the top opposite the pole.

FIG. 7 is a side plan view of the paddle showing the edge 212 and the transition area 206. The taper from the bottom 208 to the top of the paddle is clearly shown.

Figure 8:
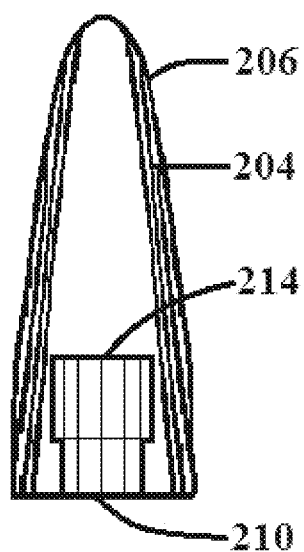
FIG. 8 is a cross-sectional side view of the paddle of FIG. 3 according to an embodiment of the invention.

FIG. 8 is a cross-sectional side view of the paddle showing the bottom hole 210 and an internal pole connector 214. The particular configuration of the pole connector is adapted to suit the pole. The connector is shown as centered in the paddle but the connector position may be adapted to suit different configurations.

Figure 9:
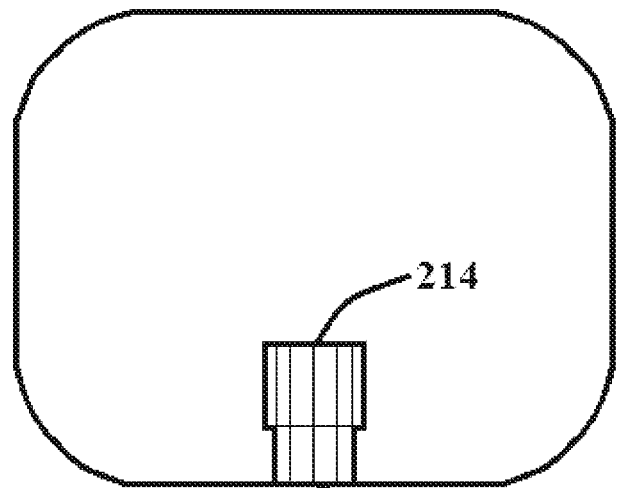
FIG. 9 is a cross-sectional front view of the paddle of FIG. 3 according to an embodiment of the invention.

FIG. 9 is a cross-sectional front view of the paddle showing the bottom hole 210 and the pole connector 214 centered in the paddle and accessible through the hole. The friction or perceived grip of the paddle is related to the coefficient of friction of the surface and the size of the contact area, e.g. Friction=$\mu$*N=$\mu$*Pressure*Area, where $\mu$ is the coefficient of friction of the paddle surface against the arm and torso and N is the force between the objects. Accordingly, a high grip surface is used and the paddle is made large enough that the user can make contact with the arm and torso against a large surface of the paddle. The paddle maximizes the available area for contact. The paddle's design takes advantage of more available surface area than other designs to increase the friction generated to hold the paddle in place under the arm of the user.

The large surface area of the paddle, further distributes the force exerted on it over a comparatively large area of the torso and the arm. This reduces pressure on the user's body by spreading the pressure out and facilitates comfort for the user. Pressure=Force/Area so that for any given force, the pressure exerted on the area of contact is inversely proportional to the area of contact. Since the paddle's area of contact is greater than the area of contact of the handle of a regular broom or rake it follows that the pressure between the paddle and the body is less than that of the broom or rake for any given force.

The paddle may be constructed of a rigid or semi rigid material such as metal, plastic, rubber or wood. Any of a variety of other thin, semi rigid materials may be used. This material may be covered with a layer that has a relatively high coefficient of friction and that covers the outside but does not cover the inside of the vertical hole 210 such as rubber or silicone. Alternatively, the cover material may be textured or surfaced to increase its friction.

The paddle is configured to be comfortable for the anticipated user. Larger persons may desire a larger paddle than smaller persons. A typical dimension for many users is approximately 5.25 inches long or wide, 4.5 inches high and 1 to 1.5 inches deep or thick. A broom stick is typically about 1 inch in diameter. Thus the paddle is a little over 5 times wider than a 1-inch broom stick. The paddle is a little more than 3 times wider than a 1.5-inch broom stick. It is also 20% to 100% wider than a typical user's arm. This width makes it easy to place the paddle under the armpit between the arm and the torso using the arm and distributes the pressure of sweeping across the width of the torso.

The vertical hole 210 is approximately 0.75 inches in diameter in the middle of the bottom, extending approximately 1.3 inches up from the bottom. The upper 0.75 inches of this hole has a slightly larger diameter of 0.875 inches to accommodate a particular type of pole connector. Alternatively, the hole may be constructed in the bottom of the paddle with a set diameter of approximately 0.75 inches and 1.3 inches high without the larger diameter at the upper 0.75 inches of the hole.

The paddle serves as a comfortable and easily fixed pivot point or fulcrum for the operation of the broom or other sweeping device. The paddle is easy to secure between the arm and torso and acts as an efficient fulcrum. The paddle facilitates use of the broom as an efficient lever. The wedge shape described above provides a good fit to the user since the nearer the arm is to the armpit, the narrower the distance between the arm and the torso.

The described concave shape laterally across the front and rear of the paddle also improves the fit. The area of contact is also improved because the paddle will simultaneously hug the convex curve of the upper arm and convex curve of the side of the torso. The paddle will also tend to center itself on the arm and torso. The described paddle provides a large available area of contact between the upper arm and the side of the user's torso when resting or gently pressed into the armpit and squeezed between the arm and torso when in use.

As mentioned above the large surface area of contact at the top of the broom with the paddle causes a greater force of friction to resist movement of the top of the broom so that it remains fixed and functions optimally as the fulcrum for the intended lever action of the broom or rake. The force of the muscles from the upper torso and upper arm squeezing the paddle as well as the upward force caused by slightly pulling the broom up so that the paddle makes contact with the armpit greatly increases the friction of the paddle against the user's body. This prevents the paddle from sliding between the arm and torso. In addition, the force translated to the paddle into the torso from the effort force applied at the handle when acting on the load force on the other end of the broom greatly increases the friction of the paddle against the arm and torso.

In order for two objects such as the paddle and the torso or arm, to remain fixed with relation to each other, the force of friction must be greater than a force exerted horizontal to the contact area.

Force=Pressure*Area  (Equation 1)

Force of Friction=$\mu$*N (where N is the Force Between the Objects)  (Equation 2)

Combining Equation 1 and Equation 2, where N is defined as a force provides Equation 3.

Force of Friction=$\mu$*Pressure*Area  (Equation 3)

Therefore it follows that for any given pressure over an area and given coefficient of friction ($\mu$), the force of friction increases in proportion to the surface area of contact.

Also as previously mentioned, the force of friction between the paddle and the torso increases as the force of the effort applied to the load increases. Where the force of the effort is equal to the sum of the force applied to the load and the force applied to the fulcrum. In a class 3 lever system, the effort arm is the distance between the middle effort force and the fulcrum at one end and the load arm is the distance between the end load resistance and the other end of the fulcrum. A class 3 lever always has a mechanical advantage less than 1 since the load arm is always longer than the effort arm.

$$MA = (\text{Length of Effort Arm})/(\text{Length of Load Arm}) \quad \text{(Equation 4)}$$

$$F(\text{Load}) * (\text{length of Load Arm}) = F(\text{Effort}) * (\text{length of Effort Arm}) \quad \text{(Equation 5)}$$

$$F(\text{Load}) = F(\text{Effort}) * MA \quad \text{(Equation 6)}$$

$$F(\text{Effort}) = F(\text{Load}) + F(\text{Fulcrum}) \quad \text{(Equation 7)}$$

$$F(\text{Fulcrum}) = F(\text{Effort}) - F(\text{Load}) \quad \text{(Equation 8)}$$

$$F(\text{Fulcrum}) = F(\text{Effort}) - \{F(\text{Effort}) * MA\} \quad \text{(Equation 9)}$$

Therefore, the force at the fulcrum is proportional to the force of the effort. That is, any increase in effort force results in an increase of force at the fulcrum which therefore increases the force of friction between the paddle and the torso.

The paddle is more comfortable than the top handle of a regular broom or a ring around an arm in similar designs when used in a comparable manner where the force is calculated by Equation 9 above.

In light of this and Equation 1, for any given force, the pressure exerted on the area of contact is inversely proportional to the area of contact. That is, an increase in the area for any given force applied results in a decrease in pressure over the contact area.

Since the area of contact of a regular broom stick or handle or an arm ring is many times less compared to the described paddle, the pressure into the arm and torso (e.g. in pounds per square inch) is greater for any given force than the pressure of the paddle into the arm and torso.

Also, since arm ring designs use a shorter effort arm than the described design herein, a greater proportion of the effort force is translated into the arm than is translated to the torso from the paddle that takes advantage of a longer effort arm. As indicated by Equation 9, a smaller mechanical advantage results in a greater portion of the F (Effort) being translated to the fulcrum. Since a higher pressure for any given effort force will cause a higher force of the arm ring to dig into the arm and in the example of a regular broom handle will also dig into the torso and armpit more than a lower pressure afforded by the paddle's design, it follows that the paddle is more comfortable to utilize for the fulcrum of the broom than the top of a regular broom handle or arm ring design.

In embodiments as described in more detail below, the paddle is configured to allow it to rotate freely about the vertical axis of the broom pole. This allows the broom head to be rotated by twisting the handle. Different sweeping strategies may be employed while maintaining the position of the paddle between the arm and torso. For example, a viable tactic for extracting cigarette butts from an expansion joint in a cement surface is to twist the broom head so that bristles are parallel with the joint. The broom or rake head may be rotated during a sweep or between sweeps.

Alternatively, the paddle may be fixed securely to the top connecting pole. The position of the paddle may be adjusted and fixed to different rotational positions by means of a simple lever tube clamp attached at the center of the paddle to the handle connecting pole (as shown, for example, in FIG. 21). A slightly smaller upper tube is fit into a larger tube at the bottom. This configuration is well-suited for situations where the user does not use the twisting action for differing sweeping strategies and has a preferred position for the paddle relative to the position of the handle and broom or rake head.

Figures 10, 11:
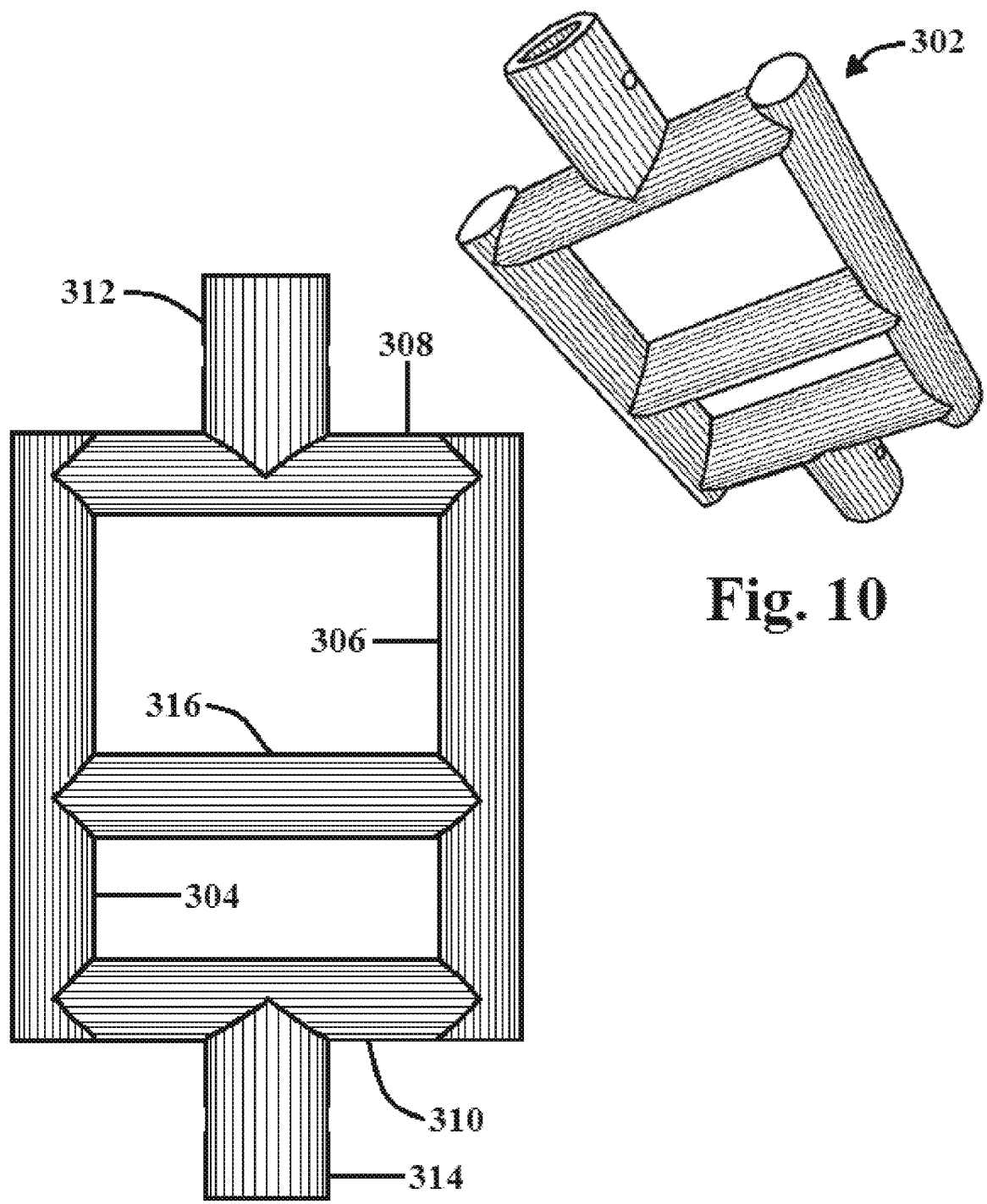
FIG. 10 is an isometric view of an example handle suitable for use with the sweeping device according to an embodiment of the invention.
FIG. 11 is a front plan view of the handle of FIG. 10 according to an embodiment of the invention.

FIG. 10 is an isometric view of an example handle 302 suitable for use as the handle 106 held by a hand of the user to cause sweeping motions of the broom or rake head.

FIG. 11 is a front plan view of the handle 302 showing a hand grip 316 in the form of a tubular structure between opposite vertical support tubes 304, 306. The vertical supports are held in place by an upper bar 308 and a lower bar 310 each parallel to the hand grip. The upper bar 308 has a central tube 312 extending up and away from the hand grip to couple to the paddle connecting pole 110. The lower bar 310 has a central tube 314 extending down and away from the hand grip to couple to the broom head connecting pole 120. The hand grip is shown as a circular tube but may have different shapes to better suit hand shapes. The hand grip may also have finger contours and other surfacing to provide a more secure grip to the user.

The handle may be constructed of a strong, light, rigid material such as metal, plastic, wood, fiberglass or another composite material. It may be coated for greater comfort with rubber, silicon, or a soft plastic. The handle provides a naturally positioned and comfortable grip that allows one to efficiently hold and operate the sweeping device. The softer material may also be selected to have a higher coefficient of friction than the wood, plastic or metal from which the handle is made in order to increase the force of friction between the user's hand and the handle. This increases usable contact with the hand grip as well as comfort.

The handle is horizontally positioned and provides an ergonomic grip. The grip is designed to efficiently fit a hand. For example, the grip's dimensions may be configured to be similar to a bike handle or a D-shaped shovel handle. The hand grip of the handle may be coated with a softer material such as rubber or silicone to increase comfort as well as increase the friction force between the hand and handle. The horizontal position of the hand grip also allows the user to grip the handle naturally without flexing or turning the wrist. In embodiments, the handle is in a natural position in which the distance between the bottom of the broom head resting on the ground and the palm or the hand's height off the ground provide a relaxed arm and hand position.

As shown, the handle has a smaller lower opening between the hand grip and the lower bar. The lower opening fits fingers underneath the grip and is large enough so that fingers can easily penetrate the opening. The handle has a larger upper opening between the top bar and the hand grip that fits the palm above the grip. The palm is thicker than fingers and so more space is allotted. The larger opening also allows the wrist to touch the upper horizontal bar of the handle. The handle 302 may alternatively be formed as a circular or elliptical shape instead of the rectangular shape as shown. This may provide improved aesthetics or function. For improved comfort, the ends of the upper 308 and lower 310 bars may be curved or angled from the horizontal configuration shown.

The handle is also specifically positioned with respect to the vertical length of the broom or rake. The handle is at the distance between the palm and armpit as measured from the top of the paddle. A longer distance to the handle provides a greater distance available for the effort arm which allows for the greatest Mechanical Advantage (MA) where MA=(effort arm)/(load arm).

The width of the handle allows the user's hand to rotate or twist the sweeping head about the axis the connecting poles. The handle having a wide hand grip affords another mechanical advantage over regular vertical broom handles. The width of the hand across the hand grip functions as a lever arm equally on each side of the broom's axis because the handle is placed in the center of the vertical axis of the broom. This provides useful torque that aids twisting of the broom or rake head about its axis to desired positions and resists unwanted torque that twists the broom or rake head about its axis when an uneven force is translated from the sweeping head to the handle during sweeping. When the hand grip is wider than a user's hand, then the user is able to move the hand along the hand grip to one side or the other to further increase the rotational force applied in one direction to the sweeping head.

The radius of either side of the centrally positioned hand on the horizontal grip from each edge of the hand to the center axis of the broom is greater than the radius of a vertical grip on a regular broom handle from the center axis. Therefore, a greater Mechanical Advantage is demonstrated by the handle's central horizontal placement along the axis of the broom. The end result is greater control of the rotational position of the broom during adjustment or when sweeping. Since MA=(effort arm/load arm), it follows that a (longer arm)/(load arm)>(shorter arm)/(load arm) or a longer load arm MA is greater than a shorter load arm MA.

There is also a further mechanical advantage from the central position of the handle along the axis of the connecting poles of the broom. The central position provides the user with equally free movement of the hand to rotate about the wrist in either direction and thereby focus a transfer of rotational force from the hand to the broom pole axis and thus rotate the sweeping head for different rotational positions of the sweeping head. This provides for a more efficient use of a broom or rake by facilitating different rotational strategies of the bristles on the broom head and an easy and efficient way to cause or resist torque.

In the example shown in FIG. 11, the handle is comprised of a solid rectangularly shaped frame whose parts are constructed from 4 cylinders, pipes, or tubes, plus a central cylinder for the hand grip. The frames dimensions are about 8.5 inches vertical height by 4.7 inches outside horizontal width. The cylinders' circumferences are circular or oval shaped and have a diameter of approximately 1 inch. The fifth hand grip cylinder is within the rectangular frame and is also about 4 inches long with a diameter of approximately 1 inch and a circumference that is circular or oval shaped. The fifth cylinder is internally connected at each end to the 8-inch vertical cylinders in a horizontal position about an inch above the top most portion of the bottom 6-inch frame cylinder. The diameter and circumference of the hand grip may be configured to be larger than a vertical broom handle. This provides for a more efficient use of the grip that is easier to hold.

The upper and lower bar with the hand grip creates two rectangular openings in the rectangular-shaped cylindrical frame. The larger top opening above the hand grip having a dimension of approximately 2.3 inches tall×3.3 inches wide×1 inch deep. The bottom opening below the hand grip has a dimension of approximately 1 inch tall×3.3 inches wide×1 inch. These dimensions may be adapted to suit different size hands and other implementations. The height of the openings may be increased to allow more room for a hand to maneuver or for structural reasons.

An additional hollow cylinder, such as a pipe or tube, approximately 2 inches long and 1 inch in diameter is attached to the top horizontal tube at the top of the cylindrical frame. In this embodiment, the inside diameter is approximately 0.85 inches. This cylinder is vertically positioned in the center of the top of the cylinder frame's exterior and optionally penetrates, e.g. half of the way, into the diameter of the top 6-inch cylinder.

Similarly, another hollow cylinder, pipe, or tube, approximately 2 inches long and 1 inch in diameter attaches to the bottom of the cylindrical frame. This inside diameter is also approximately 0.85 inches. This cylinder is vertically positioned in the center of the bottom of the cylinder frame's exterior and optionally penetrates into the diameter of the bottom 6-inch cylinder. These vertical cylinders may be configured with one or more horizontal holes of approximately 0.2-inch diameter near the center positioned evenly around the circumference of the vertical cylinder for attaching the connecting poles 120, 110.

FIG. 12 is a side plan view of the handle of FIG. 11 showing one of the pipe-like vertical supports 304 and the upper 312 and lower 314 central tubes. These tubes have holes 324, 326 to receive retaining pins of the respective upper and lower connecting poles 320, 322 (shown in FIG. 14).

FIG. 13 is a top plan view of the same handle showing the upper bar 308 extending across the handle 302. The central tube 312 is visible as being about the same diameter as the upper bar and having a central opening to receive the upper connecting pole 320.

FIG. 14 is a front cross-sectional view showing the handle 302 and the upper 312 and lower 314 tubes. A portion of the upper 320 and lower 322 connecting poles is shown inserted into the tubes. The poles are locked into position with pins that engage the holes 324, 326 in each tube, respectively. In this example, there are two holes in each tube, one on each opposite side of the tube. The pins prevent rotation and vertical movement of the poles in the tubes. The length of the tubes prevents horizontal movement of the pole.

Figure 15:
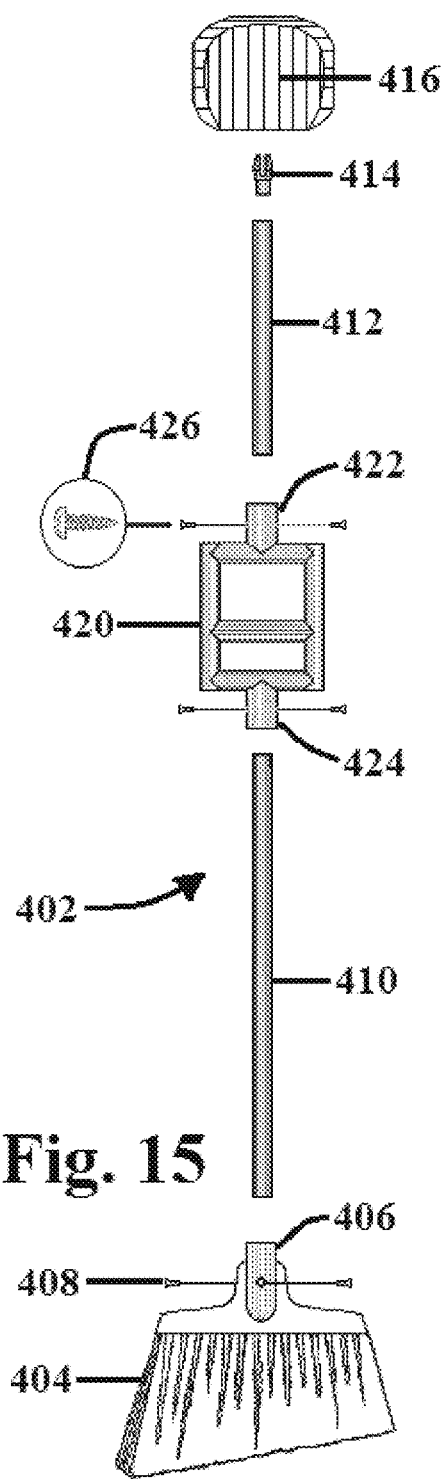
FIG. 15 is an exploded front plan view of a complete ergonomic broom according to an embodiment of the invention.

FIG. 15 is an exploded front plan view of a complete ergonomic sweeping broom 402 according to an embodiment. The broom has a broom head with bristles 404 at the bottom. The broom head is attached to the broom handle through a vertical receiver 406. A broom head to handle pole 410 of the broom stick is placed into the receiver 406. The pole is held in place by pins or screws 408 that are inserted into the receiver through the pole to attach the broom head to the broom stick. A variety of different fasteners may be used instead of the illustrated screws including nails, rivets, or adhesives. A standard broom handle threaded connection to a broom head socket may be used. Alternatively, a variety of clips, clamps and spring pins may be used including those described in more detail below.

A handle 420 such as the handle described above is attached to the broom head to handle pole 410 opposite the broom head 404. The handle has a vertical tube 424 extending from the bottom of the handle to receive the upper end of the broom head to handle pole 410. The pole is retained by screws or pins similar to those of the broom head receiver. A paddle to handle pole 412 is similarly inserted into an upper vertical tube 422 to extend the broom stick above the handle. The paddle to handle pole 412 may also be secured using two or more screws 426 one each on opposite sides of the pole extending through the tube and into the pole as in the other examples. While the poles are shown as being inserted into receivers of the handle and the broom head, the interaction may be reversed so that the tubes are inserted into a larger end of a respective pole. Screws or any other fastener may be used as described.

For the use scenario of FIG. 1, the broom head may have typical dimensions for a two-handed sweeping broom where the bundle of bristles is approximately 1 inch wide, 8 inches long and 6 inches high. These dimensions may be modified to be larger or smaller by 40% or more depending on specific use designs. For other applications a different broom head size and shape may be used.

The paddle to handle pole 412 extends upward from the handle and receives the paddle 416 at an end opposite the handle 420. The paddle fastener may be one or more screws as described for the other pole connections or a different connection may be used. In the illustrated example, a press fit connector 414 is used to connect the top pole 412 to the paddle 416. The connector allows the paddle to rotate freely about the vertical axis of the broom stick. The rotation facilitates different sweeping strategies while maintaining the optimal position of the paddle between the arm and torso.

A cylindrical press fit connector may be constructed of a semi rigid material such as metal, plastic or wood. In order to conform to the dimensions herein, the connector includes a cylinder approximately 2.25 inches high and 0.75 inches in diameter. The top 1.25 inches inside is hollow and the inside diameter is approximately 0.5 inches. The bottom 1 inch may be solid.

The top 0.75 inches has a bottom outside diameter that is approximately 0.875 inch that tapers evenly to 0.7 inches up to the top forming a wedge shape. There are 4 evenly spaced vertical cutouts with a width of 0.15 inches at the top 1 inch of the connector.

The press fit connector connects the paddle to the paddle to handle connecting pole to allow the paddle to rotate about its center vertical axis. The top 1.25 inches fits into the bottom vertical hole of the paddle. The bottom 1-inch fits into the pole of similar shape and is attached with any suitable fastener such as screws or adhesives. The top portion's 4 wedge shaped "tabs" flex inward to fit inside the bottom vertical hole of the paddle and then spring back to the original shape as the connector enters the larger upper diameter portion of the vertical hole of the paddle as shown in FIGS. 8 and 9.

Figure 16:
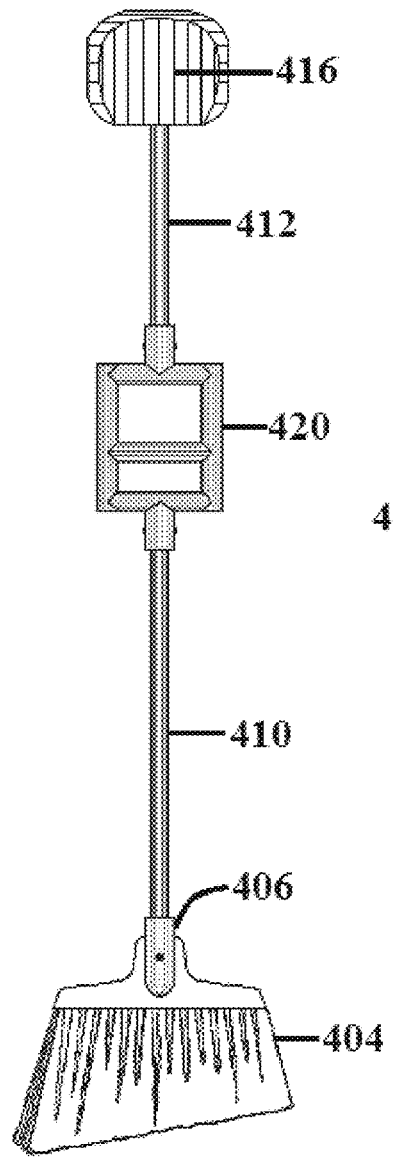
FIG. 16 is a front plan view of the assembled broom of FIG. 15 according to an embodiment of the invention.

FIG. 16 is a front plan view of the components of an example sweeping device assembled together. The broom head 404 is attached by a receiver 406 to a lower pole 410 that is attached to the handle 420. The handle is attached to the upper pole 412 which is attached to the top paddle 416. More or fewer components or connections may be used depending on the implementation. Some of the components may be combined into a unitary structure.

Figure 17:
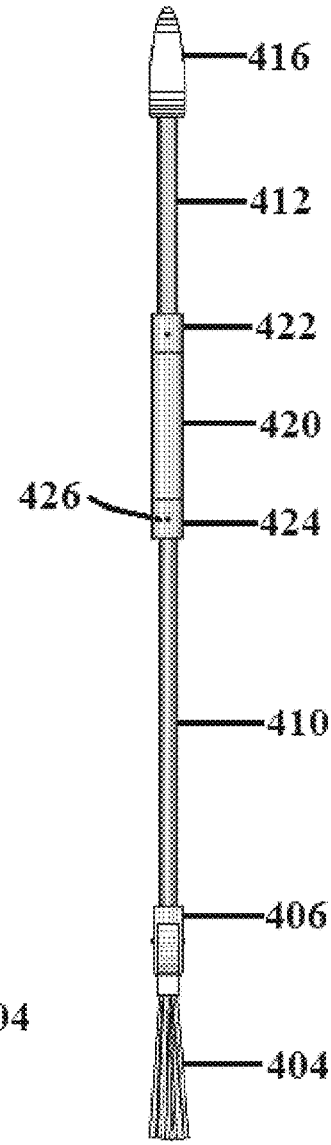
FIG. 17 is a side plan view of the assembled broom of FIG. 15 according to an embodiment of the invention.

FIG. 17 is a side plan view of the broom of FIG. 16 showing the fasteners 426 and the holes into which the fasteners are inserted to connect the poles to the handle. Other types of fasteners may be used as alternatives to those shown. By using removable or releasable fasteners, different length poles 410, 412 may be used to suit different users. Different heads 404 may be used to suit different tasks. Different handles 420 and paddles 416 may also be used to suit different users and different tasks.

Figures 18, 19, 20:
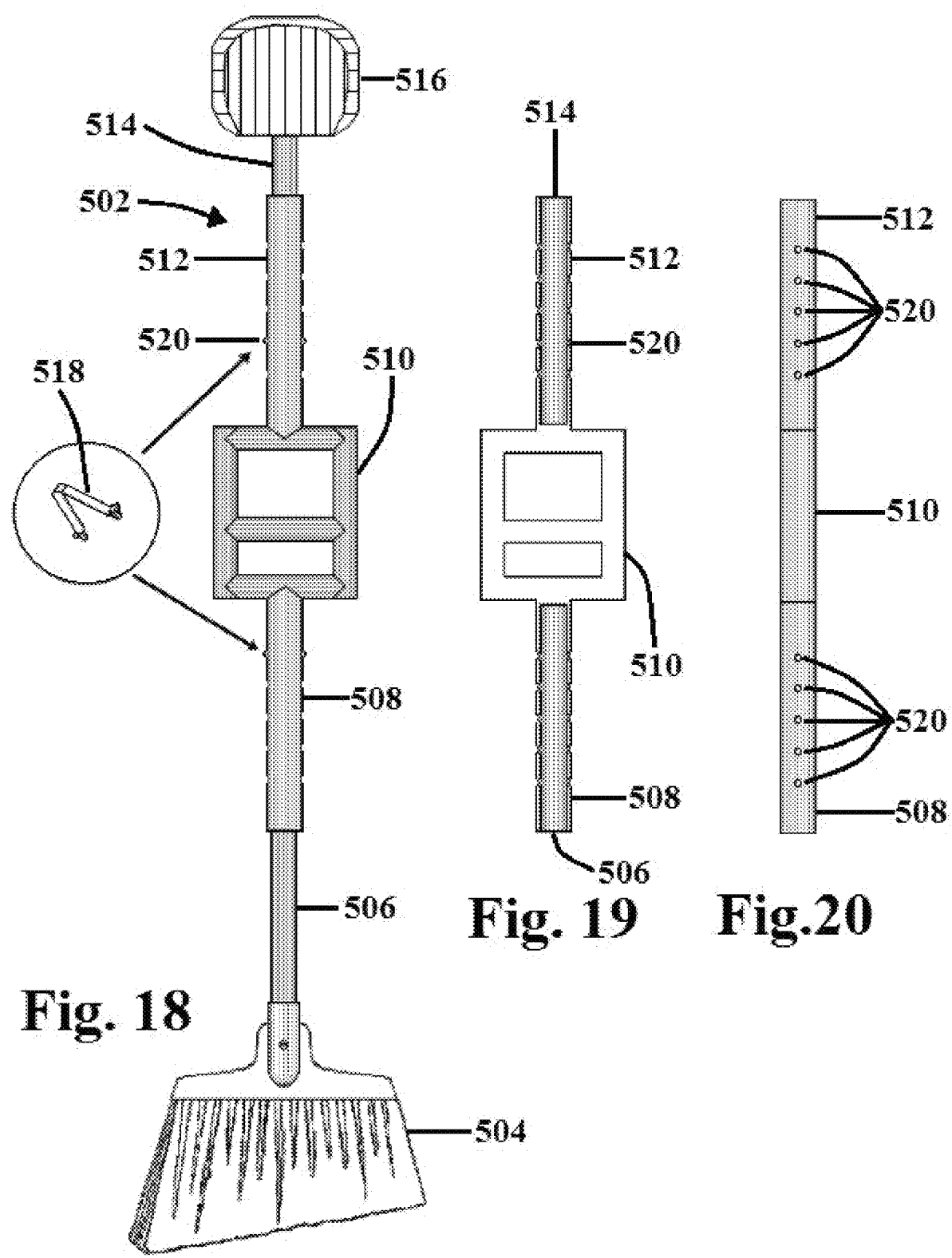
FIG. 18 is a front plan view of an ergonomic broom with telescoping and locking poles according to an embodiment of the invention.
FIG. 19 is a cross-sectional front view of the telescoping poles of the broom of FIG. 18 according to an embodiment of the invention.
FIG. 20 is a side plan view of the telescoping poles of the broom of FIG. 18 according to an embodiment of the invention.

FIG. 18 is a front plan view of an alternative sweeping device configuration in which the upper 512, 514 and lower 506, 508 connecting poles have an adjustable height. Both connecting poles are constructed as two-piece concentric telescoping poles. The length may be adjusted for different users. Any of a variety of different telescoping pole configurations may be used. The poles may be fixed in relative position with respect to each other using any of a variety of different devices. A circular tube clamp, elliptical rotating tubes, threaded rotating lock rings, or any other suitable fixing device may be used. In the example of FIG. 18 a double push button mechanism 518 is used. A clip has a leaf spring bent at its middle and a button at each end of the spring. The buttons are pressed through opposite holes in the two tubes of each pole by the spring.

The poles each have a concentric inner tube 506, 514 with two holes 520 positioned at the same length from one end of the tube and 180 degrees from each other. The simple lever spring 518 is placed inside the inner tube with a button at the end of each of the lever arms pointing outward in opposite directions and are fitted inside the two holes in the inner tube. These buttons are sized and adjusted to fit and are fitted inside the two holes in the inner tube. The buttons protrude outside the tube through the respective holes at a length approximately 3 times the width of the tube's shell or wall.

A larger outer tube 508, 512 with an inside diameter slightly larger than the outside diameter of the respective inner tube 506, 514 and with a similar tube shell width as the inner tube slides over the inner tube. The outer tubes have two or more sets of 180 degree oppositely opposed holes that are the same size as the two holes of the inner tube. When positioned correctly, the simple lever spring's buttons penetrate through the holes of the inner tube and of the outer tube locking the tubes together. One can then adjust the inner tube's position by pressing in the buttons so that the outsides of the buttons are inside the inner diameter of the outer tube, thereby allowing the inner tube to move with respect to the outer tube. When the buttons match a different set of holes on the outer tube, the buttons pop out pushed by the leaf spring though the different set of holes and lock the inner tube to the outer tube into a new position.

As an alternative, one or more of the outer tubes 508, 520 described above may be attached or integrated into the handle 510. In one example, the mold of the handle also includes the larger tube with multiple sets of holes. Alternatively, the inner tubes 506, 514 may be attached or integrated into the handle so that the outer tubes are attached to the paddle and sweeping head.

FIG. 19 is a cross-sectional front view of the handle and connecting poles of FIG. 18. The upper 512 and lower 508 outer tubes are concentric and each have a series of five holes 520 on each side to allow the upper 514 and lower 506 inner tubes, respectively, to be moved to five different positions with respect to the outer tubes. More or fewer holes and positions may be used to suit particular implementations. By allowing both the upper and lower connecting poles to be adjusted, the position of the handle 510 may be adjusted in addition to the overall length of the broom. This allows different user arm lengths both from the palm to the armpit, and from the ground to the palm to be accommodated as well as total length from the ground to the armpit. An adjustable range of 8 inches for both the upper and lower pole is suitable to adjust the sweeping device for most users. As an example, depending on the height of the broom and of the handle the poles may each vary from between e.g. 12 and 20 inches. With the two telescoping poles, this would allow 16 inches of variation in total length. This adjustability also allows the sweeping device to be reduced in size for storage.

FIG. 20 is a side plan view of the handle 510 and the upper 512 and lower 508 outer tubes of the connecting poles of FIG. 17. The five holes 520 are clearly seen along the sides of each of the outer tubes.

Figure 21:
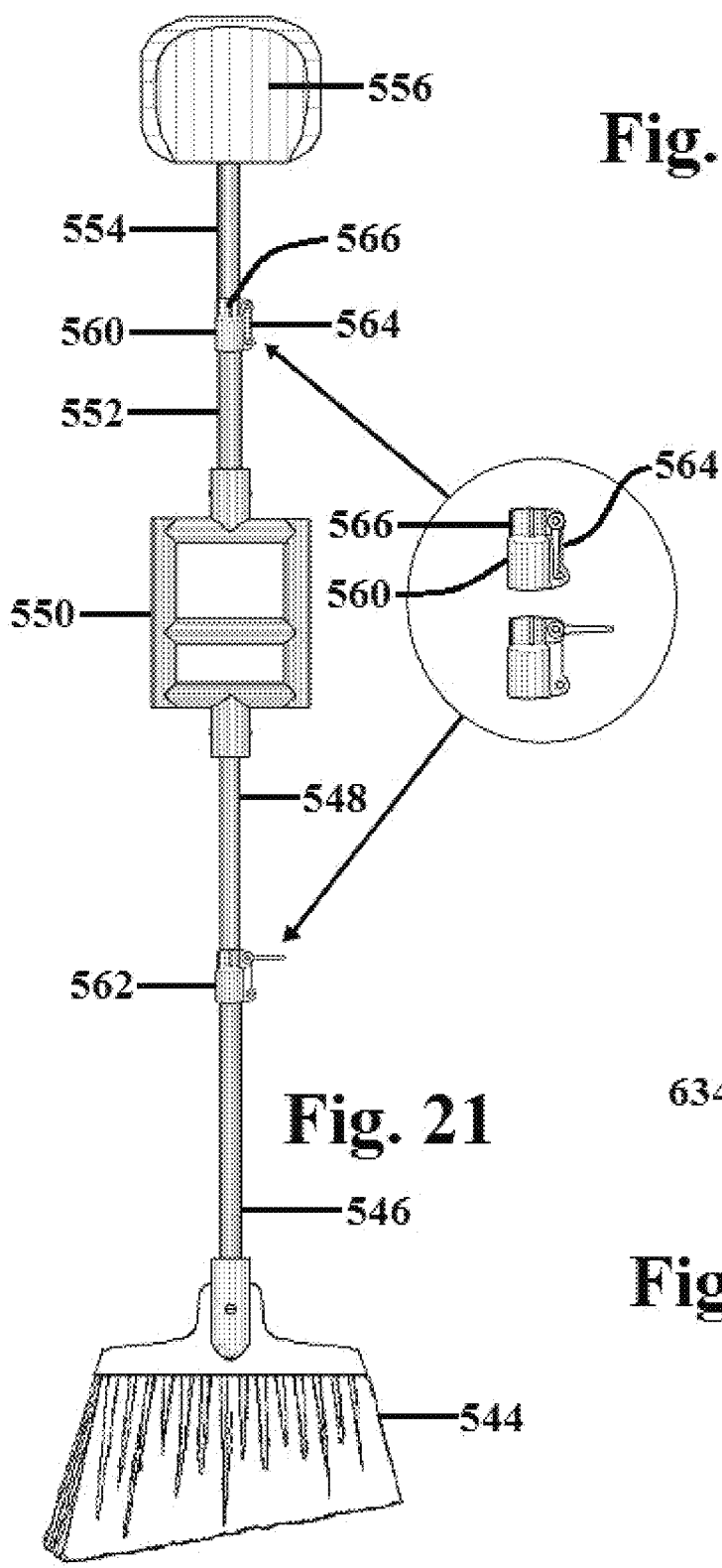
FIG. 21 is a front plan view of an ergonomic broom with alternate telescoping and locking poles according to an embodiment of the invention.

FIG. 21 is a front plan view of an alternative adjustable sweeping device using a lever action quick clamp instead of the spring-loaded buttons of FIG. 18. A broom head 544 or any other sweeping head is attached to a lower connecting pole that has an inner 548 and outer concentric tube 546 that slide with respect to each other to reach different lengths. The outer tube 548 as shown, or alternatively, the inner tube is connected to an ergonomic handle 550 with a horizontal hand grip. A second upper connecting pole has an inner 554 and outer 552 tube that also slide with respect to each other to provide different lengths. The outer tube 552, or alternatively, the inner tube is attached to the top of the handle 550. The inner tube 554 is attached to a top paddle 556 that provides a second location to grip the sweeping device.

The inner and outer tubes are fixed in place with respect to each other using a simple lever action tube clamp 560 fixed to the lower, or alternatively, the upper part of a tube. The slightly smaller diameter tube 548, 554 is inserted from the top into the lower tube 546, 552 through the tube clamp 560. The smaller tube's outside diameter is slightly smaller than the larger tube's inside diameter and can freely move both vertically and rotationally when a lever 564 on the tube clamp is open. The smaller tube then becomes fixed in place relative to the larger tube when the lever on the tube clamp is closed which squeezes the upper pole. In the illustrated example, the lever 564 reduces the diameter of the upper part 566 of the clamp 560 into which the inner tube has been inserted. The clamping diameter reduction grasps the inner tube to hold it in place.

When this type of telescoping pole is used for the upper connecting pole 552, 554, and the paddle is fixed in place on the upper pole, then the paddle may be fixed at any rotational position instead of freely rotating. Alternatively, an additional lever clamp (not shown) may be used between the top of the upper connecting pole 554 and the paddle to control the rotational position of the paddle without affecting the length adjustment of the upper connecting pole 552, 554.

As shown herein the overall broom stick has a central handle 550 with a paddle 556 to handle connecting pole 552, 554 on the upper side of the handle and a handle to sweeping head 544 connecting pole 546, 548 on the other lower side of the handle. The paddle to handle connecting pole acts as a strong and rigid lever arm between the paddle (the fulcrum) and the handle which is the effort of the lever system. The upper connecting pole is the effort arm and also serves as the upper portion of the load arm which extends from the top fulcrum to the bottom load at the sweeping head.

The distance between the paddle and the handle is adjustable and may be adjusted so that the paddle rests 1-2 inches below the armpit. The pole is further adjusted so that the hand grip of the handle rests comfortably in the hand.

The handle to sweeping head connecting pole connects the horizontal handle to the sweeping head. It acts as a strong and rigid lever arm between the handle (the Effort of the lever system) and the broom or rake head which is the load of the lever system. The bottom portion of the load arm extends from the handle to the bottom load. The entire length from paddle to sweeping head makes up the entire load arm. The distance between the handle and the sweeping head may be adjusted so that that the bottom of the head lays evenly on the ground when the arm is relaxed and the head lays approximately 12 inches from the nearest foot of the user.

The tubes may be formed as a semi-flexible construction. For example, the tubes may be semi-rigid to allow a slight spring like action as the broom or rake head is operated. The poles may be configured to bend slightly at the beginning of the sweeping action as the broom or rake first makes contact with the first few inches of the ground. This energy is then stored in the poles until the end of the sweeping or raking action when the broom head or rake head has reduced contact with the ground. At that position, the poles regain their original straightness, release the energy stored and thus increase the speed of the broom or rake head propelling the refuse into the dustpan.

The handle 550 described herein may be modified in any of a variety of different ways depending on the intended use and implementation. Other designs may be easier to manufacture yet allow for an optimally positioned paddle acting as a fixed fulcrum. In some embodiments, a vertical broom stick may be used with no specific handle. This requires that the wrist be twisted to grasp the vertical broom stick, but the paddle still allows for much better leverage and control of the head than a conventional narrow broom stick with no paddle.

The user's grip on the vertical broom stick may be improved by adding a gripping surface around the broom stick. An enlarged cushioned wrapper surrounding the broom stick may increase comfort. In the example of FIGS. 18 and 21, the grip may be in the form of a vertical handle as a separate piece that connects to the top connecting pole on one side and to the bottom connecting pole on the other. Such a vertical grip may have a 1 to 1.5-inch diameter vertical grip approximately 5 inches long that surrounds the circumference of a vertical handle structure.

A further alternative is a horizontal grip that extends in one or both directions from the vertical axis of the broom stick. Similar to the illustrated examples, such a horizontal grip may be sized to comfortably fit an average hand. A horizontal grip that extends from only one side of the vertical broom stick is comfortable to grasp with one hand, but will tend to rotate the broom stick when the user pushes the handle in a sweeping motion. By providing the horizontal grip in both directions, the user can center the hand about the vertical broom stick with fingers on each side of the broom stick. This eliminates the twisting motion but since the broom stick must pass between the fingers, it may be uncomfortable over time. Horizontal grips may be manufactured into the mold of a vertical handle or be attached to a vertical broom stick in a variety of ways. It may be screwed or clamped to the broom stick using a simple tube clamp at one side of the handle. A clamp may permit the user to attach the handle at different vertical positions to suit different users.

Figure 22:
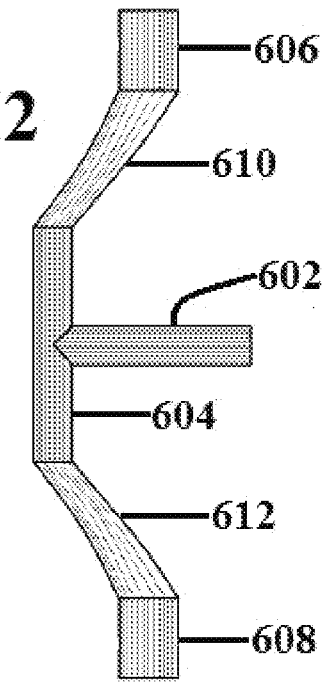
FIG. 22 is a front plan view of an alternate handle suitable for use with the sweeping device according to an embodiment of the invention.

FIG. 22 is a front plan view of another alternative horizontal handle. This handle provides a hand grip 602 that is centered with respect to the broom stick similar to the handle of FIGS. 18 and 21. This handle may be considered to be similar to that horizontal handle with one vertical edge or side of the handle removed. As a result, the hand grip is still horizontally positioned central to the vertical axis of the broom or rake head to allow all of the benefits of the handles described above.

The hand grip 602 is attached to one vertical support 604 instead of two. The vertical support is attached to an upper bar 610 on one side and a lower bar 612 on the other side. The upper bar is attached to an upper central connection tube 606. The paddle to handle connecting pole attaches to this tube in any of the ways described herein. Similarly, the lower bar is attached to a lower central connection tube 608. The lower tube attaches to the handle to head connection pole as also described herein. The upper and lower bar may be horizontal as shown in e.g. FIG. 11. Alternatively, the upper or lower bar or both may be angled at 60 degrees or another angle from the horizontal as shown. The angled structure provides more room for the user's hand and makes it easier to grasp the hand grip.

In addition, because the upper and lower bars only connect to one vertical support, they extend only from the one vertical support to the central vertical axis of the connecting poles. It is not necessary to extend further to another vertical support on the other side of the horizontal hand grip. This may allow for a reduction in material and weight for the handle. In the illustrated example, the vertical support and the upper and lower bars are approximately in the shape of three straight chords of a semicircle. In some implementations, the vertical support and the upper and lower bars may be formed as a single curved structure, such as a semicircle or a portion of a larger circle. A rounded or circular shape has structural benefits compared to straight bars but may be more expensive to fabricate.

Figure 23:
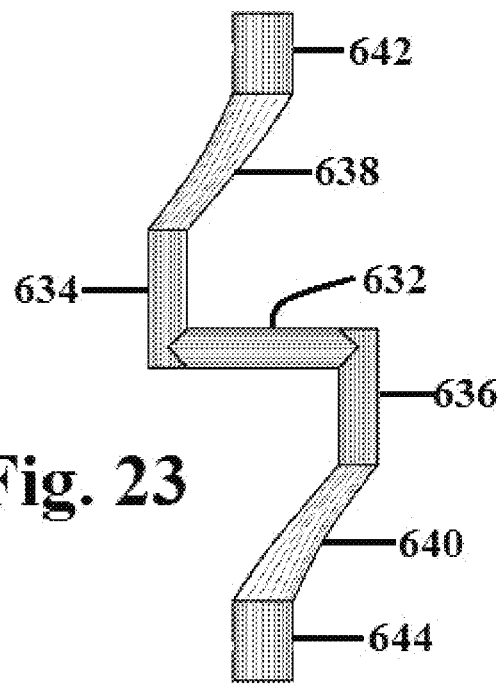
FIG. 23 is a front plan view of a further alternate handle suitable for use with the sweeping device according to an embodiment of the invention.

FIG. 23 is a front plan view of another alternative handle. This handle may be considered to be similar to the handle of FIG. 11 except that the top half of the vertical support is removed on one side and the bottom half of the vertical support is removed on the other opposite side. This creates a general "S" shaped handle in which the horizontal grip is in the middle of the "S".

The hand grip 632 attaches to the upper half vertical support 634 on one side and the lower half vertical support 636 on the opposite side. The upper half vertical support attaches to an upper bar 638 which may be horizontal or angled about 60 degrees or another angle from the horizontal as shown. The upper bar connects to the upper tube 642 to connect to the paddle to handle connecting pole. The lower half vertical support 636 attaches to a lower bar 640 which may be horizontal or angled as shown and which further is attached to a lower tube 644. While this S-shaped handle is formed of straight tubes, it may alternatively be formed of curved tubes with a straight horizontal hand grip between the tubes.

All of the handle designs described herein may incorporate a semi soft covering material over the grip with a high coefficient of friction such as silicone or rubber to increase comfort as well as provide a more stable connection between the user's hand and the grip. As a further enhancement, the grip may have four concave indentations approximately 0.25 inches deep on the bottom side of the hand grip configured to fit the four fingers of a user's hand.

Figure 24:
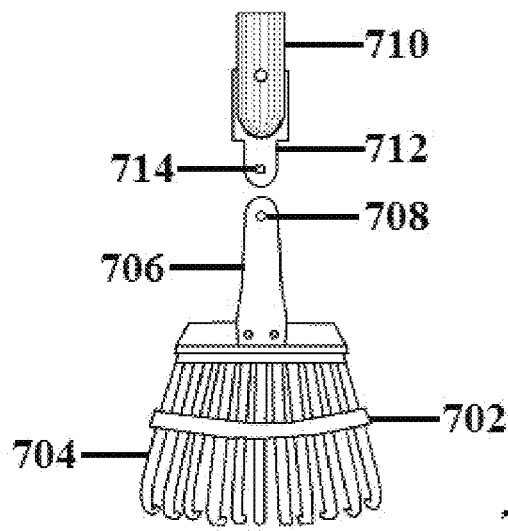
FIG. 24 is a front plan view of a rake head and mounting socket suitable for use with the sweeping device according to an embodiment of the invention.

FIG. 24 is a front plan exploded view of a rake head and mounting socket. An alternative sweeping head 702 in the form of a rake head with tines 704 is shown. The tines of the rake head are bound together as a group and connected to a rake head mount 706 with a fastener hole 708 or other type of fastener.

The fastener hole 708 of the rake head mount 706 is configured to engage with a fastener hole 714 of a fastener plate 712 of a mounting socket 710 of a handle to rake head connecting pole of the sweeping device. The rake head's tines also have the typical dimensions of a compact rake where the width of the tines laying on the ground are approximately 8 inches and the length 6 inches. These dimensions can be altered larger or smaller by 40% or more depending on specific use designs. Alternatively, a different type of rake head may be used for different implementations.

Figure 25:
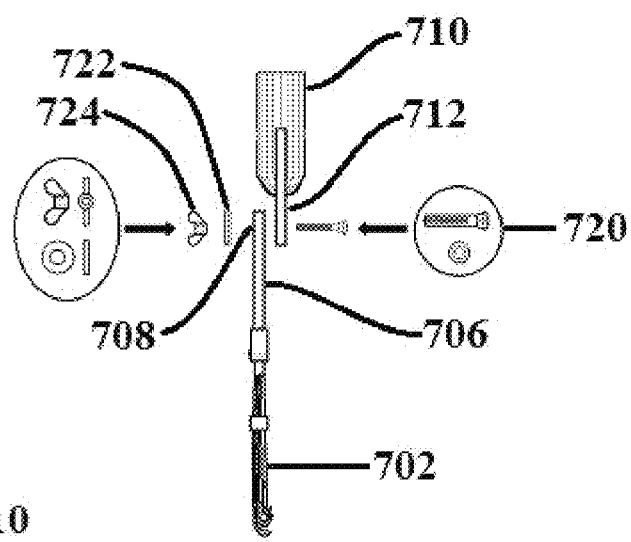
FIG. 25 is an exploded side plan view of the rake head and mounting socket of FIG. 24 according to an embodiment of the invention.

FIG. 25 is an exploded side plan view of the rake head 702 with rake tines 704 and the mounting socket 710 with the fastener plate 712 of FIG. 24. The mounting arm and fastener plate may be attached in any of a variety of different ways. In some embodiments, the mounting socket has large broom stick threads that screw into a socket in the mounting arm. A variety of quick release clamps and other fasteners may also be used including screws or adhesives.

In the illustrated example, a threaded bolt 720 is passed through the respective fastener holes 714, 708 of the fastener plate 712 and mounting arm 706. A washer 722 and wing nut 724 are screwed onto the opposite end of the threaded bolt to hold the fastener plate and mounting arm together. As an alternative to the holes and wing nuts, the bottom 2-3 inches of the handle to broom or rake head connecting pole may be configured to fit into the top of the broom or rake head and be securely fastened by means of screws that penetrate the handle and pole or are secured by means of an appropriate adhesive or epoxy.

Figure 26:
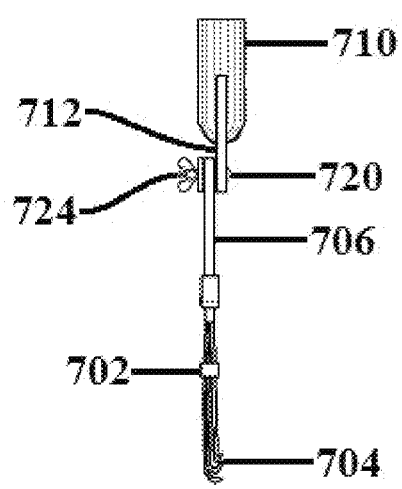
FIG. 26 is an assembled side plan view of the rake head and mounting socket of FIG. 24 according to an embodiment of the invention.

FIG. 26 is a side plan view of the fastener plate and mounting arm fastened together by the bolt and wing nut. The wing nut allows the rake head to be removed and replaced without any tools. It also allows the angle of the rake head with respect to the vertical to be modified by loosening the wing nut, moving the rake head and then re-tightening the wing nut. FIG. 27 shows an angled position while FIG. 28 shows a straight vertical position of an alternative rake head design. Tabs may be used to hold the rake head in one of set of selected positions and other types of fasteners may be used.

FIG. 27 is a front plan view of a complete rake head sweeping device in accordance with the principles described herein. The sweeping device has a rake head 702 attached to a bottom socket 710 with a bolt and wing nut as shown in FIG. 26. The socket is attached to a rake head to handle connecting pole 730 which is attached to a handle 732 with a horizontal hand grip. The handle is attached to handle to paddle connecting pole 734 which is attached to paddle 736. As shown the rake head 702 is attached at an angle to the vertical axis of the poles 730, 734. This angle may be selected and modified at will as described above.

FIG. 28 is a front plan view of a complete rake head sweeping device in accordance with the principles described herein with an alternative rake head 738. The rake head is fastened in vertical alignment with the upper and lower connecting poles 730, 734. The poles connect the handle 732 to the rake head 738 on one end and the paddle 736 on the opposite end. In this example, as in the example of FIG. 27, the poles are not adjustable or telescoping as described above. However adjustable or telescoping poles may be used instead. This allows the poles to have a simpler, lighter, less expensive construction. The poles may be first cut to an appropriate length or fabricated in an appropriate length and then attached permanently to the paddle 736, handle 732, and socket 710. Alternatively, the poles may be removable so that different lengths and materials may be used for different applications or users.

The poles in this or any other example, may have a circular horizontal cross section or any other desired shape for better grip and maneuverability, such as square, rectangle or any other geometrical shape. The poles may be hollow or solid and may be made of wood, fiberglass, metal plastic, or any of a variety of composite materials.

Figure 29:
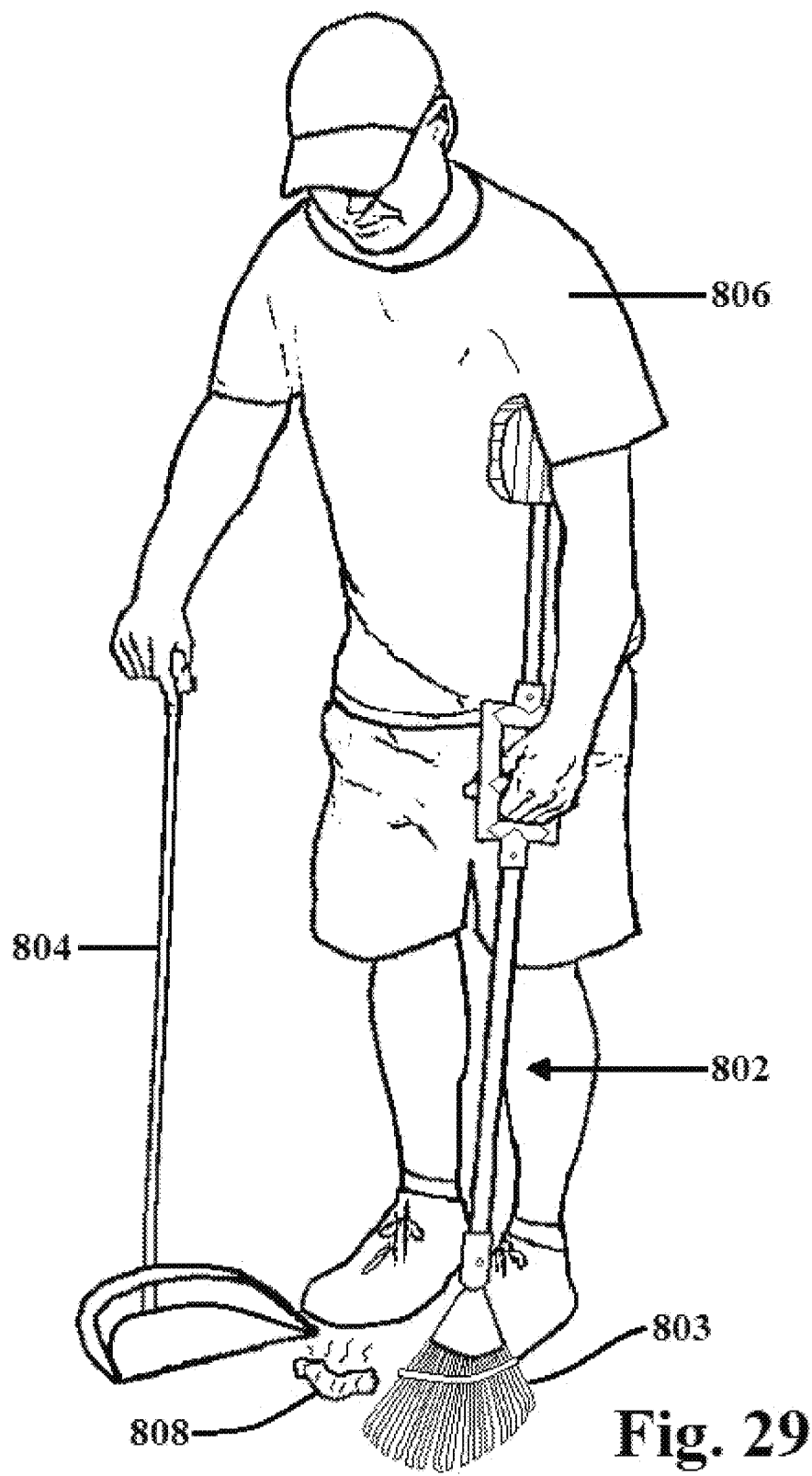
FIG. 29 is an alternate isometric diagram of sweeping refuse into a dustpan according to an embodiment of the invention.

FIG. 29 is an isometric diagram of an ergonomic unilateral sweeping device 802 with a rake head 803 in use 806 with a horizontal handled dustpan 804. As shown, the top of a broom head with angle bristles or a rake head with angled tines is firmly connected to the bottom of the handle to broom head connecting pole where the length of the head is parallel to the grip of the horizontally positioned handle.

The angle of the bristles or tines in relation to the ground when the axis is vertical approximates the angle between the vertical axis of the user's body 806 and the axis of the broom when the broom head or rake is about 12 inches from the closest user foot. This allows the bristles of the broom or tines of the rake to lay evenly on the ground when sweeping or raking laterally in the most natural position afforded when operating the tool with one arm.

Since the bottom of a broom head is equilateral, no special design modifications are needed to allow a user to switch from one side of the body to the other. However, a rake is not equilateral because the tines point in only one direction. Special design considerations may be taken to allow the user to efficiently use the rake where the tines lay evenly on the ground on either side of the body.

One rake design is a rake whose tines angle up from the center on each side at the angle previously mentioned. Therefore, the user can use half of the rake on either side of the body where one half of the tines lay evenly on the ground.

Another rake design is to use a commonly designed rake where the length of the tines forms a straight line. However, the angle of the rake head can be adjusted using a simple wing nut and carriage bolt that tightens on the rotatable junction between the rake head and the pole that connects to the handle.

The broom or rake sweeping device may be constructed, or adjusted to a range of heights via a telescoping pole which depends on the paddle to handle connecting pole length and the handle to broom or rake head connecting pole length. The optimal overall length for any individual would be the distance from the ground to around 1-2 inches below the armpit with the grip of the horizontal handle positioned at the distance from the ground to the arm resting position of the palm of the hand.

Therefore, the approximate overall length from the top to bottom can range from 40 inches for a short person up to 65 inches for a tall person. The dimensions of the paddle and horizontal handle provided above may be modified to suit different users.

The tool described herein maximizes mechanical advantage, minimizes use of smaller muscles, minimizes strain on smaller lower arm muscles and joints and maximizes reliance on larger muscles and joints. This reduces uncomfortable pressures into the body to improve ease of use for the user. This also reduces the possibility of injury while improving ease of use for the user. The paddle provides a wide area of contact, a high coefficient of friction and an ergonomic fit under the armpit to create a fixed fulcrum. This reduces uncomfortable pressures into the body to improve ease of use for the user and also maximizes mechanical advantage by providing a stable fulcrum for the lever system. The paddle to handle connecting pole uses the full distance between the armpit and the palm of the hand to maximize mechanical advantage because it creates the relatively long effort arm of the lever system. MA=(effort arm)/(load arm)

The horizontal handle is approximately centrally positioned along the tool's vertical axis to provide a further mechanical advantage. This is because the user can place half the hand's width on either side of the vertical axis. The user can easily rotate the handle about the vertical axis using longer lever arms that equally resist or produce torque on the broom or rake head. The leverage for rotation is much more than is possible with the shorter lever arm of a vertical grip around a conventional broom or rake handle.

A simpler horizontal handle extends out from a vertical broom stick in one or both opposing horizontal directions. The broom stick prevents the handle from being grasped in the central position as shown in e.g. FIG. 1. When such a one-sided handle is used part of the motive force that operates through the handle also causes torque about the axis of the broom stick. The causes an unwanted twisting and awkward control of the head of the broom or rake. The user must use smaller muscles to prevent the twisting motion which increases stress on the user.

The described sweeping tool minimizes small muscle use and maximizes large muscle use. The motive force for the sweeping motion largely comes from the action of lifting and lowering the user's arm. The force that holds the paddle in place as the fixed fulcrum comes from the action of squeezing the upper portion of the arm against the torso and from the force translated from the effort to the paddle into the torso when in use. These actions use the large muscles of the shoulder, back and torso. The smaller muscles of the fingers, hand, wrist and forearm require minimal use since they do not need to produce motive action nor flex to provide a rigid effort arm that connects the shoulder to the hand.

Abduction refers to moving a body part away from the center of the body, such as lifting the arm out and away from the body. Adduction refers to moving a body part toward the center of the body, such as bringing the arm in against the torso. Shoulder abduction results in lifting the arms out to the side. The major muscle used in the action is the deltoid. The deltoid is the large rounded, triangular muscle located on the uppermost part of the arm and the top of the shoulder.

Shoulder adduction results in lowering the arms to the side. The major muscles used in this action are the pectoralis major and latissimus dorsi. The pectoralis major is a large muscle in the upper chest, fanning across the chest from the shoulder to the breastbone. The latissimus dorsi is one of the largest muscles in the back, located in the middle of the back and it is partially covered by the trapezius. Most of the sweeping motion using the described sweeping too may be accomplished by shoulder abduction and shoulder adduction. This allows for longer and more comfortable sweeping than with other types of brooms or rakes.

A lesser or more handle, paddle, sweeping head, or poles than the examples described above may be desirable for certain implementations. Therefore, the configuration of the system will vary from implementation to implementation depending upon numerous factors, such as price constraints, performance requirements, technological improvements, and/or other circumstances The present description presents the examples using particular terms, such as lever, force, effort, unilateral sweep, sweeping head, handle, pole, paddle, etc. These terms are used to provide consistent, clear examples, however, the present invention is not limited to any particular terminology. Similar ideas, principles, methods, apparatus, and systems can be developed using different terminology in whole, or in part. In addition, the present invention can be applied to ideas, principles, methods, apparatus, and systems that are developed around different usage models and hardware configurations.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A sweeping device comprising
a sweeping head;
an elongated pole attached to the head;
a paddle attached to an end of the elongated pole opposite the sweeping head, the paddle being wider than the elongated pole, the paddle having a front surface and a rear surface that extend horizontally and vertically with respect to the pole on respective opposite sides of the pole, wherein the front and rear surfaces are curved with a concave shape from the center of the front and rear surfaces to the edges of the front and rear surfaces so as to provide an area of contact between an arm and a torso;
a handle attached to the pole between the paddle and the sweeping head, the handle having a hand grip in a form of a structure extending in two directions from opposite sides of an axis of elongation of the pole, and configured to rotate the sweeping head about only a single axis with respect to the paddle; and
a pole connector at the end of the pole opposite the sweeping head including a cylinder in a bottom vertical hole of the paddle centered in the paddle and attached to the elongated pole and configured for rotation of the paddle with respect to the handle about the single axis.

2. The device of claim 1, wherein the pole connector allows the paddle to rotate freely about the vertical axis of the pole.

3. The device of claim 1, wherein the pole connector is a press fit connector.

4. The device of claim 1, wherein the bottom vertical hole has a diameter that is larger in an upper portion than in a bottom portion to retain the pole connector in the upper portion.

5. The device of claim 4, wherein the pole connector includes vertical tabs that press outward as a spring within the upper portion to secure the pole connector in the bottom vertical hole.

6. The device of claim 1, wherein the distance between the front and rear surfaces of the paddle is smaller at the center of the front and rear surfaces and is larger at the edges of the front and rear surfaces.

7. The device of claim 1, wherein the front and rear surfaces form a wedge shape with the narrow part of the wedge at the top of the paddle opposite the sweeping head where the front and rear surfaces are closer together.

8. The device of claim 1, wherein the handle extends equally in opposing directions and perpendicular to the axis of elongation of the pole from both sides of the of the axis of elongation of the elongated pole.

9. The device of claim 8, wherein the elongated pole has an upper section attached to the paddle and a lower section attached to the sweeping head and wherein the handle further comprises an upper bar attached to the upper pole section and a lower bar attached to the lower pole section and a hand grip between the upper and the lower bars.

10. The device of claim 9, wherein the handle has a first vertical support fastened to the upper bar and the lower bar and to one side of the hand grip and a second vertical support fastened to the upper bar and the lower bar and to an opposite side of the hand grip.

11. The device of claim 1, wherein the elongated pole has an upper section attached to the paddle and to the handle and a lower section attached to the sweeping head and to the handle and wherein the upper section telescopes to different lengths.

12. The device of claim 11, wherein the upper section comprises two concentric tubes that slide with respect to each other and a fixing device to hold the two concentric tubes in different relative positions.

13. The device of claim 12, wherein the fixing device is a lever action quick clamp attached to one of the tubes to clamp to the other one of the tubes.

14. The device of claim 1, wherein the pole connector is configured for rotation of the paddle during a sweep.

15. A sweeping device comprising
a sweeping head;
an elongated pole attached to the head;
a paddle attached to an end of the elongated pole opposite the head, the paddle being wider than the elongated pole, the paddle having a front surface and a rear surface that extend horizontally and vertically with respect to the pole on respective opposite sides of the pole, wherein the front and rear surfaces are curved with a concave shape from the center of the front and rear surfaces to the edges of the front and rear surfaces so as to provide an area of contact between an arm and a torso;
a handle attached to the pole between the paddle and the sweeping head, the handle having a hand grip in the form of a structure extending in two directions from opposite sides of an axis of elongation of the pole, and configured to rotate the sweeping head about only a single axis with respect to the paddle; and
a connector to attach the paddle to the elongated pole and configured for rotation of the paddle with respect to the handle about the single axis, wherein the connector allows rotation only about the single axis and not another axis.

16. The device of claim 15, wherein the single axis is the axis of elongation of the elongated pole.

17. The device of claim 15, wherein the handle extends across the elongated pole axis of elongation extending in two opposite directions from the elongated pole axis of elongation, the handle being fixed with respect to rotation about the elongated pole axis of elongation and configured to rotate the sweeping head when the handle is rotated.

18. The device of claim 15, wherein the paddle is a fulcrum of a class 3 lever and the sweeping head is a load.

19. A sweeping device comprising:
means attached to an elongated pole for securing an end of the elongated pole between a torso and an arm of a user, the means for securing extending horizontally and vertically to rest against the torso, the means for securing having front and rear surfaces that are curved with a concave shape from the center of the front and rear surfaces to the edges of the front and rear surfaces so as to provide an area of contact between the torso and the arm;
means attached to the elongated pole for sweeping an object along the ground; and
means attached to the elongated pole between the means for securing and the means for sweeping for receiving a gripping hand of the arm horizontally with respect to a vertical elongated pole on respective opposite sides of an axis of elongation of the pole and for moving the means for sweeping rotationally about a single axis of the elongated pole in response to a force from the gripping hand; and
means between the means for securing and the means for receiving for rotating the means for receiving with respect to the means for securing only about the single axis and not another axis.

20. The device of claim 19, wherein the means for rotating is configured for rotation during a sweep.

\* \* \* \* \*